Dec. 27, 1955  G. C. FOERSTNER  2,728,623
INNER DOOR BINS FOR UPRIGHT FREEZER
Filed Sept. 27, 1952
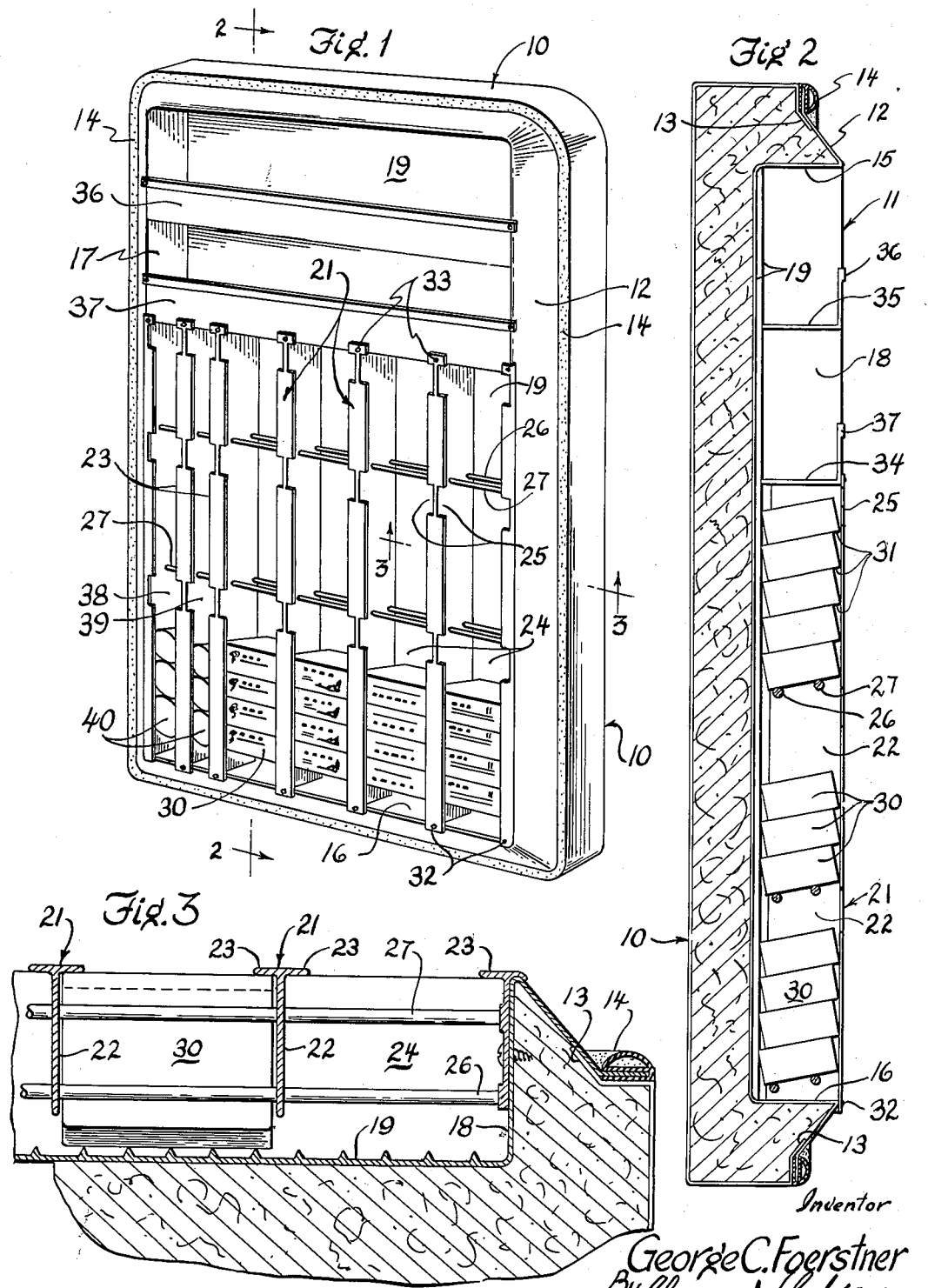
Inventor
George C. Foerstner
By Clarence Loftus
Attorney

2,728,623
INNER DOOR BINS FOR UPRIGHT FREEZER

George C. Foerstner, Amana, Iowa, assignor to Amana Refrigeration, Inc., Amana, Iowa, a corporation of Iowa Application September 27, 1952, Serial No. 311,854

4 Claims. (Cl. 312—236)

This invention relates to freezer cabinets, and is particularly directed to novel food storage means adapted to receive and retain standard sizes of frozen food packages in conveniently accessible position on the inner side of the door of an upright freezer.

It is a primary object of the invention to provide a vertical door for an upright type freezer having food storage devices of such design and construction that the standard size frozen food packages are so maintained that they are firmly supported, yet in plain sight, capable of identification, and easily accessible.

Another important object of the invention is the provision of food storage means for a vertical freezer door wherein the storage devices are of such design and construction as to afford an unusually high capacity and to accommodate a far greater amount of food than is accommodated by conventional shelving, for example.

Another important object of the invention is to provide an upright freezer door with food storage devices comprising vertical bins wherein standard size packages of frozen foods and the like may be conveniently and compactly stacked one upon another, yet wherein the food packages are held so securely that they will not be displaced even by violent opening or closing of the door.

A further object is the provision of improved means for securing a plurality of standard size frozen food packages, wherein the packages are stacked one upon another, yet angularly disposed with respect to each other so that the lower front edge of each package overhangs the one below it, so as to provide a convenient finger lift whereby the packages may be grasped for removal from the stack.

A still further object of the invention is the provision of package retaining bins for a vertical freezer door, wherein the bins are of such design and construction as to provide instant identification and easy availability of food packages, yet to be arranged for quick, easy and thorough cleaning and defrosting as may be required.

A still further object of the invention is the provision of an improved food storage receptacle for an upright freezer door wherein the food packages are stacked in vertical tiers but provided with means whereby adequate cold air circulation is accomplished on all sides of the packaged foods.

A still further object of the invention is the provision of unique vertical storage bins on the inner side of an upright freezer door, with the bins comprising flanged vertical spacers upon which are mounted small metal rods extending transversely of the spacers to serve as shelves for the food packages.

These and other important objects are accomplished according to the invention disclosed herein by an improved construction and arrangement of parts illustrated in the drawings of this specification, wherein:

Figure 1 is a perspective view of the inside of a door for a vertical freezer showing the novel food storage means of the present invention;

Figure 2 is a vertical sectional view taken substantially on the plane of the line 2—2 of Figure 1; and Figure 3 is a fragmental detail plan sectional view taken substantially on the plane of the line 3—3 of Figure 1.

The freezer door comprises an outer metal shell 10 and an inner member 11 which may be molded plastic, for example, and is provided with a central recess surrounded by an annular breaker strip portion 12 secured to the marginal flanges 13 of the exterior metal portion 10. A resilient sealing strip 14 is preferably provided as is conventional practice. The member 11 has a central cavity defined by the top and bottom walls 15 and 16, side walls 17 and 18 and a ribbed back wall 19. The recess in the member 11 is divided into a number of vertical bins by upright spacers 21, each of which includes a dividing flange 22 with one or more outer retaining flanges 23 thereon to define a plurality of side-by-side bins or channels 24.

In the preferred form of the invention, the flanges 22 are spaced apart about 5½", so that the bins 24 will accommodate standard size frozen food packages, and the flanges 23 are accordingly spaced just over 4" from the back wall 19 so that food packages of standard dimensions may be inserted through cut away portions or notches 25 in the flanges 23. The packages are then stacked on horizontal shelves comprising the transverse rods 26 and 27. These rods function as shelves and are positioned with the rods 27 at a slightly higher elevation than the rods 26, so that the rectangularly shaped frozen food packages 30 may be stacked one upon another, but will lie in somewhat angular relationship to each other as illustrated in Figure 2, and will overhang each other along their forward edges to provide finger grips 31 by which the packages may be conveniently lifted and separated when they are to be removed from the bins.

The upper and lower ends of the spacers 21 are secured to the freezer door liner 11 by screws 32 and 33 and, if desired, a portion of the recess in the door may be devoted to horizontal shelves 34 and 35 to accommodate frozen food packages of irregular or non-standard sizes. As shown, these shelves may be provided with upwardly extending flanges 36 and 37 along their forward edges to prevent dislodgement of the packages thereon in the event that the door should be violently closed.

It is also contemplated that while the bins of this invention are primarily intended for rectangular packages, yet the spacers 22 may be more closely spaced as indicated at 38 and 39 to provide accommodation for frozen fruit juice cans, as indicated at 40.

From the foregoing it will be apparent that by these teachings it is practicable to provide the vertical door of an upright type freezer with food storage devices capable of carrying a relatively large amount of packaged food, yet keeping the food in an arrangement whereby the labels of the packages are visible at all times and wherein the food is so compactly stored as to require a minimum of space within the freezer. The arrangement is such that the food packages may be easily placed in the bins or removed therefrom, and the bins themselves are of such design and construction as to be rigid, strong and durable, and at the same time so arranged as to permit quick and easy cleaning and defrosting of the freezer. Additionally, as noted above, free thermal circulation of cold air around the packages is assured since the packages are maintained away from the back wall of the door by the vertical ribs thereon.

Having thus described my invention, what I claim as new and desire to secure by United States Letters Patent is:

1. In an upright freezer, a vertical door having a plurality of bins for frozen food packages on the inner surface thereof, and at least partially within a recess on the inner surface of the door; said bins comprising a plurality of vertical spacers, each consisting of a divider flange perpendicular to the inner wall of the door and at least one retaining flange extending perpendicular to the dividing flange and partially overhanging the space between adjacent divider flanges, with spaced horizontal shelves extending between said divider flanges and cut away portions in the retaining flanges to permit insertion and removal of food packages into said bins, said shelves comprising spaced parallel rods mounted on the divider flanges at unequal heights to retain the frozen food packages in tilted position within said bins thereby providing an overhanging portion on each package for aiding in the manual removal thereof from its respective bin.

2. In an upright freezer, a vertical door having a plurality of bins for frozen food packages on the inner surface thereof, and at least partially within a recess on the inner surface of the door; said bins comprising a plurality of vertical spacers, each consisting of a divider flange perpendicular to the inner wall of the door and at least one retaining flange extending perpendicular to the dividing flange and partially overhanging the space between adjacent divider flanges, with vertically spaced horizontal perforate shelves extending between said divider flanges, and cut away portions in the retaining flanges immediately below each of said shelves to permit insertion and removal of food packages into the bin formed by pairs of adjacent spacers and adjacent shelves.

3. In an upright freezer, a vertical door having a plurality of bins for frozen food packages on the inner surface thereof, and at least partially within a recess on the inner surface of the door; said bins comprising a plurality of vertical spacers, each consisting of a divider flange perpendicular to the inner wall of the door and at least one retaining flange extending perpendicular to the dividing flange and partially overhanging the space between adjacent divider flanges, a horizontal shelf in vertical spaced relation to the bottom of said inner surface of said vertical door, and vertically extending integral projections on the inner surface of said door providing space between packages stored in said bins and said inner surface whereby air circulation is provided between the packages and the door and around said packages.

4. In an upright freezer, a vertical door having a plurality of bins for frozen food packages on the inner surface thereof, said bins comprising a plurality of vertical spacers each consisting of a divider flange perpendicular to the inner wall of the door and separated therefrom, at least one retaining flange extending perpendicular to the dividing flange and partially overhanging the space between adjacent divider flanges, a plurality of horizontal shelves in vertical spaced relation for supporting said packages and vertical integral ribs on said inner surface for maintaining said packages away from said door whereby air circulates under said packages and between said door and said packages.

References Cited in the file of this patent

UNITED STATES PATENTS

| | | |
|---|---|---|
| 455,770 | Smith | July 14, 1891 |
| 1,621,971 | Curtis | Mar. 22, 1927 |
| 1,673,812 | Dunn | June 19, 1928 |
| 1,898,922 | West | Feb. 21, 1933 |
| 2,205,192 | Fry | June 18, 1940 |
| 2,230,699 | Schulze | Feb. 4, 1941 |
| 2,562,057 | Norberg | July 24, 1951 |

FOREIGN PATENTS

| | | |
|---|---|---|
| 82,145 | Sweden | Dec. 4, 1934 |